US012317243B2

(12) United States Patent
Cox

(10) Patent No.: US 12,317,243 B2
(45) Date of Patent: *May 27, 2025

(54) DYNAMIC CONTROL SYSTEM FOR CELLULAR CAMPING AND PASSIVE MONITORING OF LTE ACTIVITY

(71) Applicant: Ubiety Technologies, Inc., Chicago, IL (US)

(72) Inventor: Michael B. Cox, Chicago, IL (US)

(73) Assignee: Ubiety Technologies, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/597,160

(22) Filed: Mar. 6, 2024

(65) Prior Publication Data

US 2024/0298306 A1    Sep. 5, 2024

Related U.S. Application Data

(63) Continuation of application No. 18/188,103, filed on Mar. 22, 2023, now Pat. No. 11,968,656, which is a (Continued)

(51) Int. Cl.
*H04W 72/0453* (2023.01)
*H04B 1/00* (2006.01)
(Continued)

(52) U.S. Cl.
CPC ...... *H04W 72/0453* (2013.01); *H04B 1/0003* (2013.01); *H04W 24/08* (2013.01); *H04W 72/1273* (2013.01); *H04W 72/21* (2023.01);
*H04W 72/23* (2023.01); *H04W 72/52* (2023.01); *H04W 76/15* (2018.02)

(58) Field of Classification Search
CPC ............ H04W 72/0453; H04W 24/08; H04W 72/042; H04W 72/0486
See application file for complete search history.

(56) References Cited

U.S. PATENT DOCUMENTS 5,675,629 A    10/1997 Raffel et al.
8,355,373 B2    1/2013 Gandham et al.
(Continued)

*Primary Examiner* — Ayaz R Sheikh
*Assistant Examiner* — Tarell A Hampton
(74) *Attorney, Agent, or Firm* — Perkins Coie LLP

(57) ABSTRACT

A system for monitoring cellular communications including a passive sensor device, processors, and memory devices. The memory devices having instructions that cause the processors to identify active downlink channels using a first radio to monitor each channel in a cellular spectrum and store downlink channel information, including configuration data, for each of the identified active downlink channels. The processors identify active uplink channels using a second radio to monitor each channel in the cellular spectrum and store uplink channel information for each of the identified active uplink channels. The processors correlate one of the active uplink channels with a corresponding active downlink channel and tune a third radio to the active uplink channel using the configuration data for the corresponding active downlink channel. The processors also tune a fourth radio to the active downlink channel corresponding to the at least one active uplink channel using the corresponding configuration data.

18 Claims, 12 Drawing Sheets

Related U.S. Application Data continuation of application No. 17/187,513, filed on Feb. 26, 2021, now Pat. No. 11,617,174.

(51) Int. Cl.
*H04W 24/08* (2009.01)
*H04W 72/1273* (2023.01)
*H04W 72/21* (2023.01)
*H04W 72/23* (2023.01)
*H04W 72/52* (2023.01)
*H04W 76/15* (2018.01)

(56) References Cited

U.S. PATENT DOCUMENTS

| | | | |
|---|---|---|---|
| 10,108,757 | B1 | 10/2018 | Aghajan |
| 11,617,174 | B2 | 3/2023 | Cox |
| 2007/0206631 | A1* | 9/2007 | Parts ................. H04W 72/1215 370/465 |
| 2008/0300002 | A1* | 12/2008 | Sheffer ................. H04B 1/7097 375/220 |
| 2009/0219909 | A1 | 9/2009 | Ko et al. |
| 2009/0227251 | A1 | 9/2009 | Lei et al. |
| 2012/0294168 | A1 | 11/2012 | Freda et al. |
| 2012/0302155 | A1 | 11/2012 | Marsolais et al. |
| 2013/0099976 | A1 | 4/2013 | Cornwall et al. |
| 2014/0011498 | A1 | 1/2014 | Aono |
| 2014/0155061 | A1 | 6/2014 | Kherani et al. |
| 2014/0378151 | A1 | 12/2014 | Wan |
| 2015/0334766 | A1 | 11/2015 | Lee et al. |
| 2016/0081084 | A1 | 3/2016 | Blankenship et al. |
| 2016/0088484 | A1 | 3/2016 | Yang et al. |
| 2016/0119857 | A1 | 4/2016 | Mohan et al. |
| 2016/0262118 | A1 | 9/2016 | Kim et al. |
| 2016/0309491 | A1 | 10/2016 | Dai et al. |
| 2017/0264381 | A1 | 9/2017 | Mengwasser |
| 2020/0235788 | A1 | 7/2020 | Rajagopal et al. |
| 2021/0195484 | A1 | 6/2021 | Khawer et al. |
| 2022/0014257 | A1 | 1/2022 | Anderson et al. |
| 2023/0224882 | A1 | 7/2023 | Cox |

* cited by examiner

Uplink Activity Database

| EARFCN | Activity Occurrences (timestamps) | Potential Factors in Decision Criteria |
|---|---|---|
| A | $t_1$<br>$t_2$<br>$t_3$<br>$t_4$<br>...<br>$t_{N_A}$ | Total Number of Occurrences: $N_A$<br><br>Average Age of Events: $t_{now} - \dfrac{\sum_{n=0}^{N_A} t_n}{N_A}$<br><br>Set of Occurrences Within a Time Bucket $\beta i$: $\{t_n \mid t_{min} \leq t_n \leq t_{max}\}$<br><br>"Recency Weight": $\sum_{i=0}^{N_\beta} AverageAge(\beta_i) * \dfrac{|\beta_i|}{N_A}$<br><br>Others: ... |
| B | $t_1$<br>$t_2$<br>$t_3$<br>$t_4$<br>...<br>$t_{N_B}$ | Total Number of Occurrences: $N_B$<br><br>Average Age of Events: $t_{now} - \dfrac{\sum_{n=0}^{N_B} t_n}{N_A}$<br><br>Set of Occurrences Within a Time Bucket $\beta i$: $\{t_n \mid t_{min} \leq t_n \leq t_{max}\}$<br><br>"Recency Weight": $\sum_{i=0}^{N_\beta} AverageAge(\beta_i) * \dfrac{|\beta_i|}{N_B}$<br><br>Others: ... |
| ... | ... | ... |

*FIG. 9*

DYNAMIC CONTROL SYSTEM FOR CELLULAR CAMPING AND PASSIVE MONITORING OF LTE ACTIVITY

CROSS-REFERENCE TO RELATED APPLICATIONS

This patent application is a Continuation of U.S. Non-Provisional patent application Ser. No. 18/188,103, filed Mar. 22, 2023, entitled "DYNAMIC CONTROL SYSTEM FOR CELLULAR CAMPING AND PASSIVE MONITORING OF LTE ACTIVITY," which is a Continuation of U.S. Non-Provisional patent application Ser. No. 17/187,513, filed Feb. 26, 2021, entitled "DYNAMIC CONTROL SYSTEM FOR CELLULAR CAMPING AND PASSIVE MONITORING OF LTE ACTIVITY," the disclosure of which is incorporated herein by reference in its entirety.

TECHNICAL FIELD

This patent application is directed to passively monitoring cellular activity, and more specifically, to dynamically assigning available hardware to monitor activity across substantially all of a cellular spectrum.

BACKGROUND

Communications sent from a cell tower to a cellular-enabled device are referred to as "downlink" communications. Communications sent from the device to a cell tower are referred to as "uplink" communications. Each communication on the downlink is sent on a specific frequency or channel and each communication on the uplink is sent on a specific channel. In 4G LTE, for example, these channels are referred to as E-UTRA Absolute Radio Frequency Channel Numbers (EARFCNs).

In order to monitor communications to and from a nearby cellular-enabled device, a passive sensor device needs to be tuned to the correct channel (i.e., EARFCN) at the time that the communication occurs. Otherwise, the communication will be missed. This process of tuning to a particular channel is often referred to as "camping" on that channel. However, it is not practical to simply camp on all cellular spectrum channels simultaneously due to hardware constraints.

BRIEF DESCRIPTION OF THE DRAWINGS

The systems and methods described herein may be better understood by referring to the following Detailed Description in conjunction with the accompanying drawings, in which like reference numerals indicate identical or functionally similar elements:

FIG. 9 is a table including example factors that may be used as decision criteria for selecting a radio for monitoring a particular channel;

Figure 1:
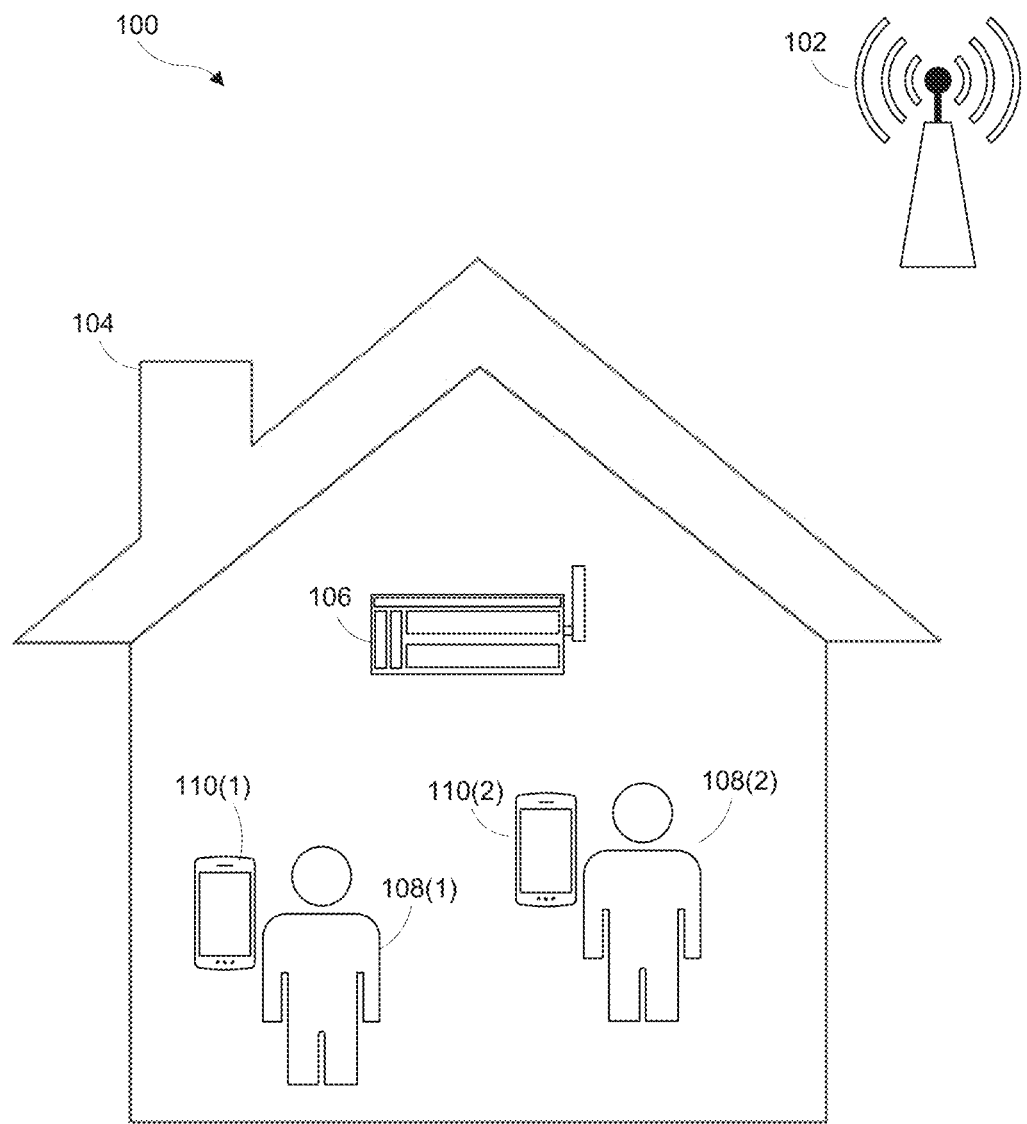
FIG. 1 is a diagram illustrating a wireless device detection and data analytics powered security monitoring system according to some embodiments of the disclosed technology.

The headings provided herein are for convenience only and do not necessarily affect the scope of the embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to unnecessarily limit the embodiments described. On the contrary, the embodiments are intended to cover all suitable modifications, combinations, equivalents, and alternatives falling within the scope of this disclosure.

DETAILED DESCRIPTION

Various examples of the systems and methods introduced above will now be described in further detail. The following description provides specific details for a thorough understanding and enabling description of these examples. One skilled in the relevant art will understand, however, that the techniques and technology discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such.

Disclosed are methods and systems for observing the cellular landscape in order to dynamically assign available hardware to monitor activity across substantially all of a cellular spectrum in order to collect and process wireless transmissions and digital signaling data, such as permanent or temporary identifiers used in wireless protocols. This technology can be used, for example, in data analytics powered security monitoring systems for identifying and tracking one or more people within an area, such as in and around a private residence or commercial business.

The disclosed technology provides a novel capability for using an array of radios to passively monitor for the presence of nearby cellular devices. This array of radios may comprise fixed radios, software defined radios (SDRs), or a combination of the two. By using this capability on a passive sensor device, the system can monitor for the presence of any nearby cellular-enabled device across an arbitrary number of cellular carriers simultaneously. The nature of the presented control system is also dynamic, and is adaptable to any environment in which the SDR array may be deployed (urban, suburban, rural, and international). This dynamic nature allows for the system to constantly learn about the cellular environment around it, and therefore improve over time as well as automatically update itself based on any changes to that cellular network.

FIG. 1 illustrates a security monitoring system 100. In this example, a sensor 106 is installed in a home 104 and detects wireless interfaces contained within wireless devices 110(1) and 110(2), each of which is associated with a corresponding user 108(1) and 108(2). Representative security monitoring systems are further described in co-pending U.S. patent application Ser. No. 16/801,915, filed Feb. 26, 2020, and entitled ELECTRONIC DEVICE IDENTIFICATION SYSTEM, APPARATUSES, AND METHODS, and U.S. patent application Ser. No. 17/072,948, filed Oct. 16, 2020, and entitled WIRELESS DEVICE DETECTION SYSTEMS AND METHODS INCORPORATING STREAMING SURVIVAL MODELING FOR DISCRETE ROTATING IDENTIFIER DATA, the disclosures of which are incorporated herein by reference in their entireties.

The sensor 106 can be configured to passively receive transmissions from both cell towers 102 and the cellular enabled electronic devices 110(1) and 110(2), to collect and process signaling data that can be used to detect, confirm the presence of, and/or identify a nearby cellular-enabled device, also referred to herein as user equipment (UE). In order to collect the signaling data, the sensor 106 needs to be tuned to the correct channel at the time that the communication occurs. The sensor 106 also needs to be tuned using the same configuration that is previously agreed upon by the cell towers 102 and the UE.

Figure 2:
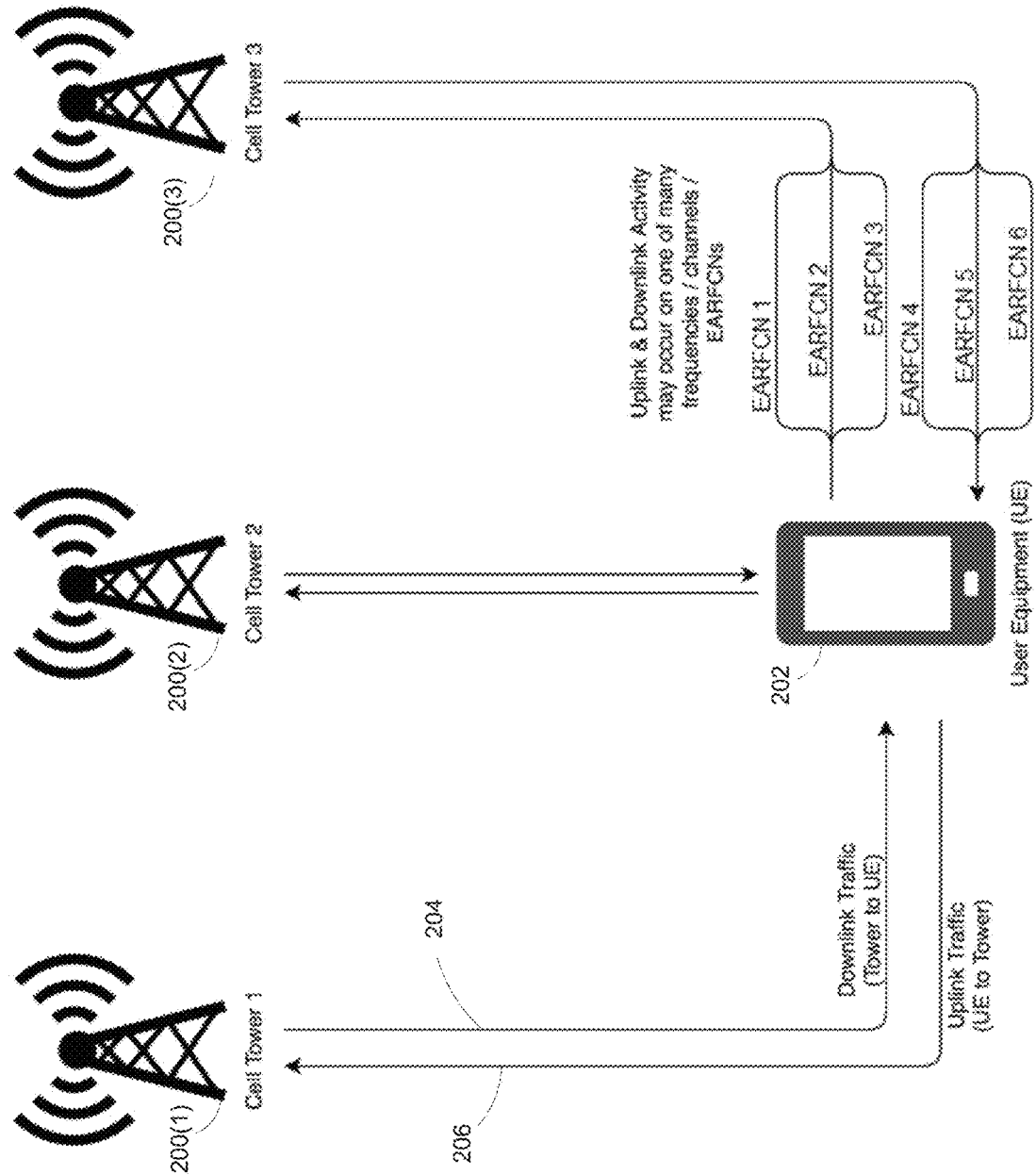
FIG. 2 is a schematic diagram illustrating cell tower uplink and downlink communications.

With reference to FIG. 2, communications, such as messages or packets, sent from cell towers (e.g., towers 200(1)-(3)) to a cellular-enabled device 202 are referred to as "downlink" communications 204. Communications sent from the device 202 to a cell tower are referred to as "uplink" communications 206. Each communication on the downlink is sent on a specific channel or EARFCN and each communication on the uplink is sent on a specific channel or EARFCN. As noted above, in order to monitor communications 204 and 206 to and from a nearby cellular-enabled device 202, a passive sensor device needs to be tuned to the correct channel (i.e., EARFCN) at the time that the communication occurs. In addition, the sensor device needs to monitor this frequency using the configuration that is being used by the cell tower at the time. This process of tuning to a particular channel is often referred to as "camping" on that channel. However, it is not practical to simply camp on all cellular spectrum channels simultaneously due to hardware constraints. Provided herein are systems and methods to observe the cellular landscape in order to dynamically assign available hardware to monitor activity across substantially all of a cellular spectrum.

Figure 3:
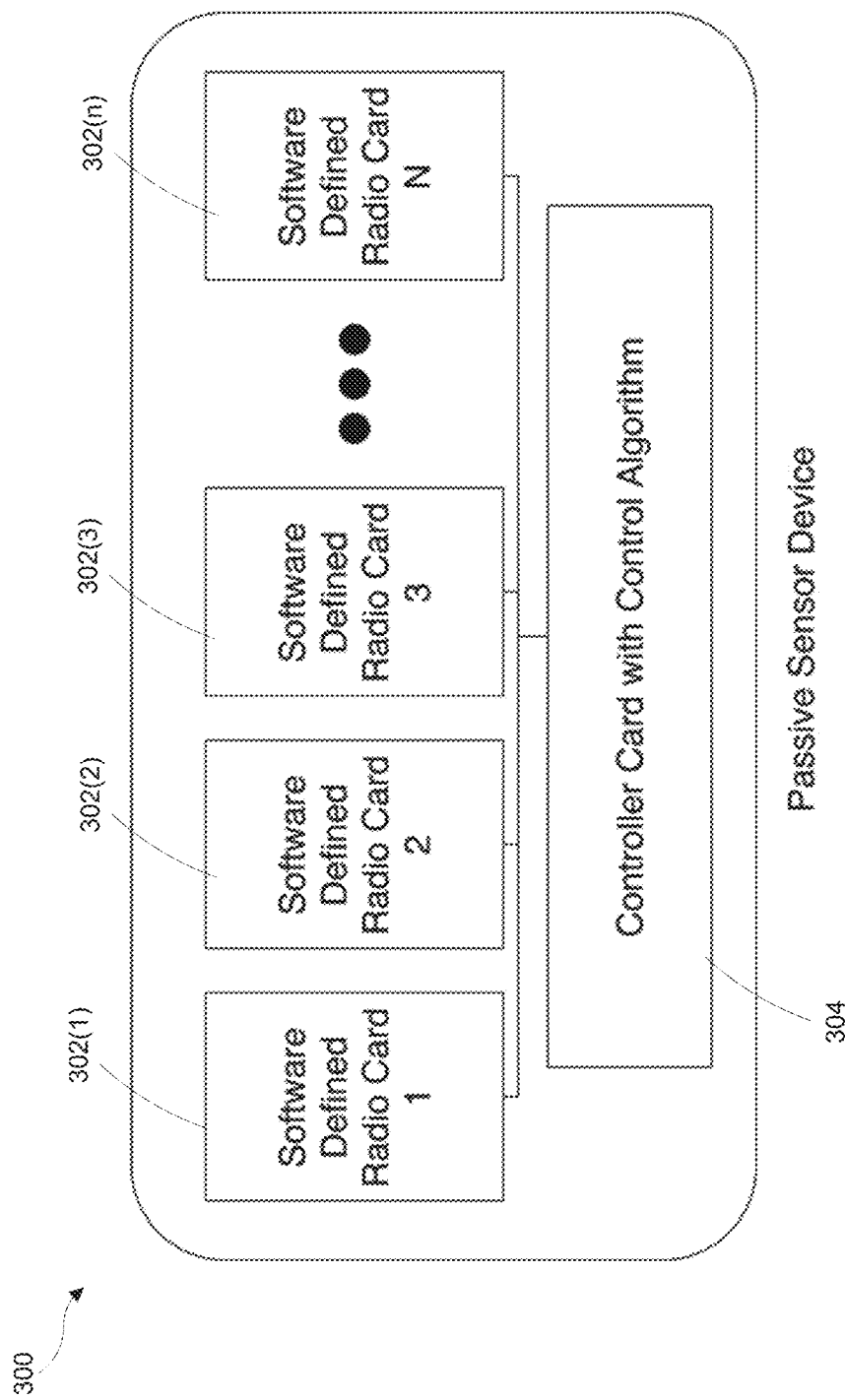
FIG. 3 is a block diagram of a passive sensor device according to some embodiments of the disclosed technology.

FIG. 3 illustrates a passive sensor device 300 according to some embodiments of the disclosed technology. The sensor device 300 can include an array of one or more SDRs 302(1)-(n). In some embodiments, the array of radios can comprise fixed radios, SDRs, or a combination of the two. A SDR is a radio communication system where components such as mixers, filters, amplifiers, modulators/demodulators, detectors and others are implemented in software or firmware. An SDR can be dynamically "tuned" using software processes and provide the versatility needed to address a larger frequency spectrum. The sensor device 300 can include a controller card 304 having one or more processors and one or more memory devices. The memory devices can include instructions that when executed by the one or more processors cause the one or more processors to perform the methods disclosed herein.

Figure 4:
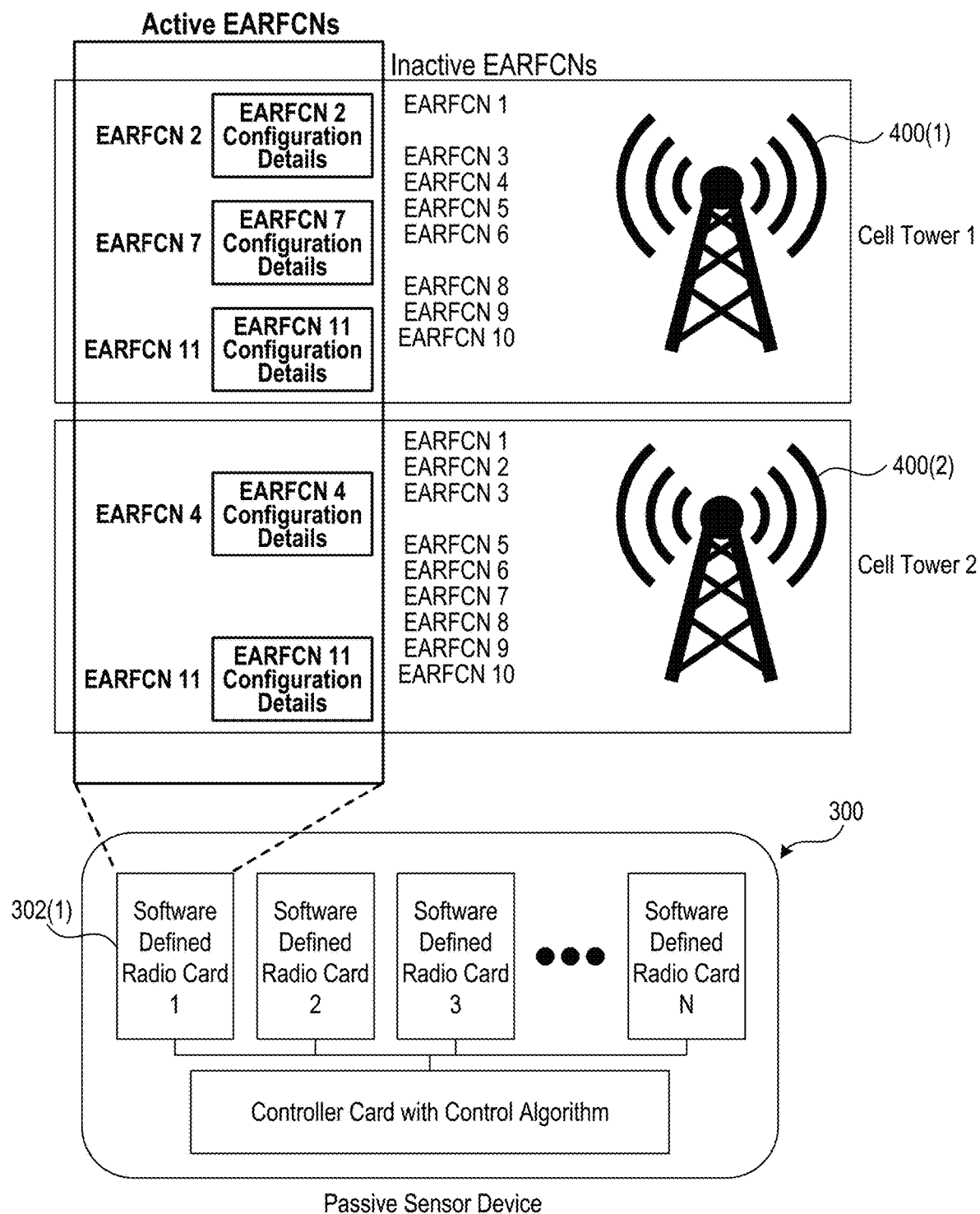
FIG. 4 is a block diagram representing a system configured to identify one or more active downlink channels in a cellular spectrum according to some embodiments of the disclosed technology.

Turning to FIG. 4, LTE coverage can vary from location to location. For example, one carrier may have excellent coverage in an area that another carrier has no coverage. In addition, a carrier may have only a single cell tower in an area, and they may also have many cell towers (some of which may even be serving the same EARFCN). For this reason, the system is configured to observe, learn from, and classify the cellular landscape wherever the passive sensor device 300 is deployed.

In order to determine which EARFCNs are being served in an area, the system first uses a radio that is capable of sweeping through the LTE spectrum, such as SDR1 302(1). With this radio, the system searches through each possible channel or EARFCN (e.g., EARFCNs 1-11) and checks whether or not there is a tower (e.g., Cell Towers 400(1)-(2)) in range that is serving that EARFCN. If there is a tower serving that EARFCN, the system makes a note of that EARFCN. In the example depicted in FIG. 4, Cell Tower 1 400(1) is currently serving EARFCNs 2, 7, and 11 and Cell Tower 2 400(2) is serving EARFCNs 4 and 11.

As part of its interrogation of each EARFCN, the system also makes a note of all of the configuration details that the cell tower is using in order to serve that EARFCN. These can include details about which cell tower is serving the EARFCN, as well as the technical details that the UEs would need to implement in order to successfully communicate with that tower. These technical details can include: Network Provider, Number of TX Antennas, PRACH Config Index, PRACH Frequency Offset, SIB2 Periodicity, and others. On receiving these details, the system adds them to a local database (e.g., "Downlink Configuration Database") that saves every served EARFCN with all of its configuration details about which towers are serving that EARFCN in that area, and the times at which those configurations were last observed.

Cell carriers tend to change the configurations of their towers periodically. Thus, the system re-calibrates itself and updates the Downlink Configuration Database if it detects any changes from any of the configurations on the towers in the area. Multiple towers may be serving the same EARFCN. Accordingly, the system differentiates between different towers, even on the same frequency. The passive sensor device may not be able to detect or decode messages if it is camping on a cell tower that is different from the one that the UE is actually communicating with. In addition, each tower may use a different configuration to communicate, even on the same frequency. Therefore, the system uses one SDR (e.g., SDR1 302(1)) to constantly sweep through the LTE space querying for any new EARFCNs or updates to any existing EARFCNs. The system may also "tune" its sweeping behavior to only re-check the uplink channels that are being actively used in an area.

Just because an EARFCN is served by a tower in the area (i.e., the EARFCN appears in the Downlink Configuration Database) does not necessarily mean that the EARFCN is actually used by the carrier, or by any UEs in the area. For example, carriers may have configured their towers to be capable of serving EARFCNs A, B, C, D, and E in a particular area. However, the carrier could have also configured the towers to only actually use EARFCN C and E. In this scenario only EARFCNs C and E need to be monitored to capture all of the activity in the area.

Figure 5:
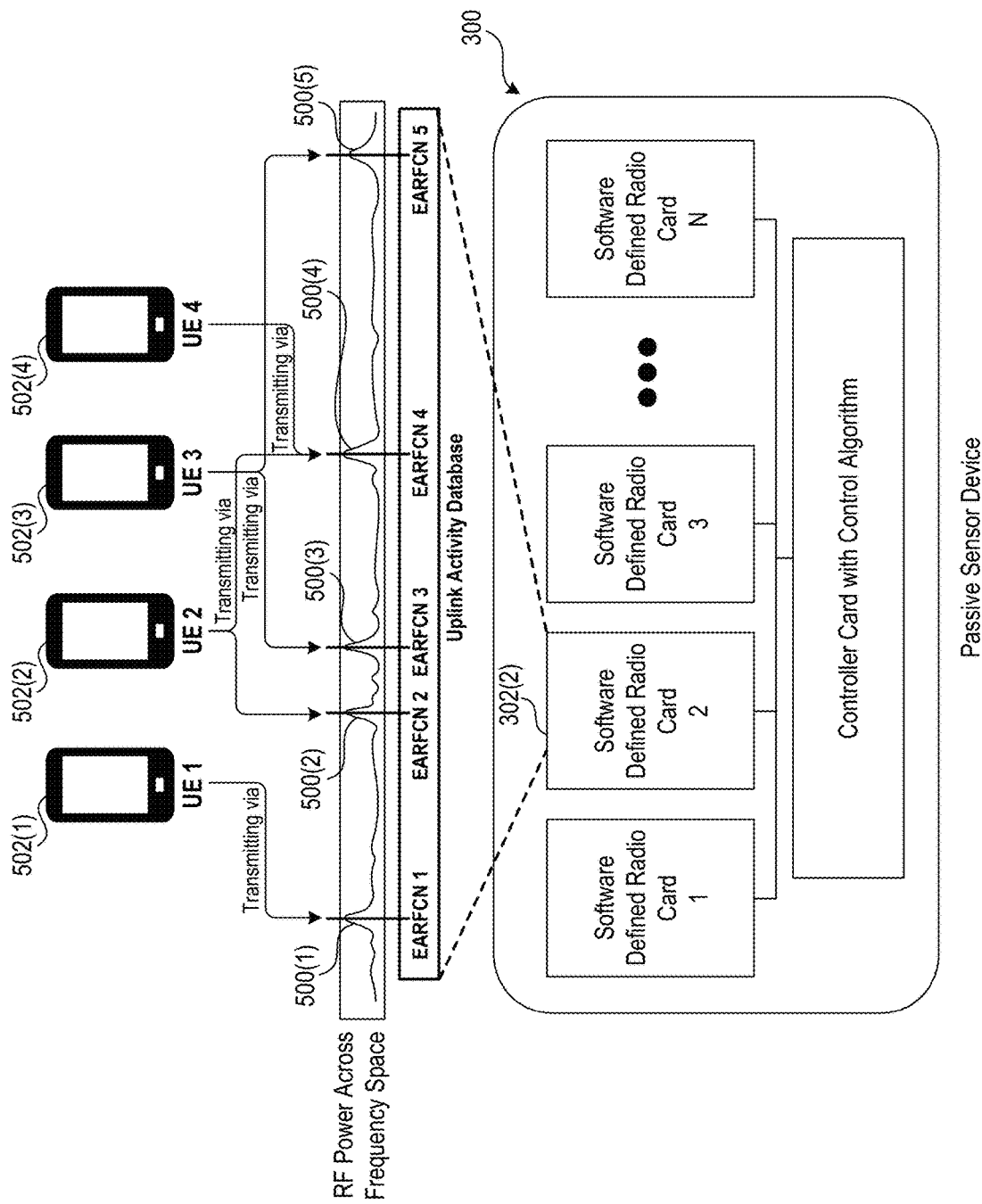
FIG. 5 is a block diagram representing a system configured to identify one or more active uplink channels in a cellular spectrum according to some embodiments of the disclosed technology.

As shown in FIG. 5, to obtain this information, the system again uses another SDR (e.g., SDR2 302(2)) to sweep through the LTE space. However, unlike in the downlink case (which watches only for downlink activity from the cell towers), this SDR can be used to monitor for uplink activity. If it detects an increase in Radio Frequency (RF) power (e.g., 500(1)-(5)) in the LTE spectrum, it can combine uplink and downlink information to confirm the actual presence of a UE (e.g., 502(1)-(4)) on that EARFCN. In some embodiments, the system also performs verifications of the uplink activity based on the types of packets transmitted. Once the actual presence of a UE is confirmed on an EARFCN, the system can then add a record of a UE in the area communicating on that EARFCN to a database (e.g., "Uplink Activity Database"). In some implementations, a UE will uplink on multiple EARFCNs. For example, UE2 502(2) and UE3 502(3) each use two EARFCNs. Typically, one channel is used for chirps and one for data intensive activity such as video streaming. In some embodiments, the system monitors both channels as different information can be gathered from each.

Once the Downlink Configuration Database collects enough information to be representative of the actual cellular environment in the deployment area, the system can correlate new records in the Uplink Activity Database with the configuration information that was previously collected in the Downlink Configuration Database. For example, in some embodiments, an uplink channel can be correlated to a downlink channel by matching information contained in the configurations in the Downlink Configuration Database, such as uplink/downlink pair information.

The Downlink Configuration Database and Uplink Configuration Database may contain useful identifying information about the cellular signaling that is being detected. If the system detects confirmed UE activity around EARFCN C, and EARFCN C is an AT&T EARFCN in the deployment area, it can be said that the detected UE is likely an AT&T device. By watching uplink activity in this manner over a period of time, the system can build up a history of which EARFCNs are being most actively used in the immediate vicinity of the passive sensor device. This activity can be collected to help understand patterns in how different network carriers behave in different areas.

Figure 6:
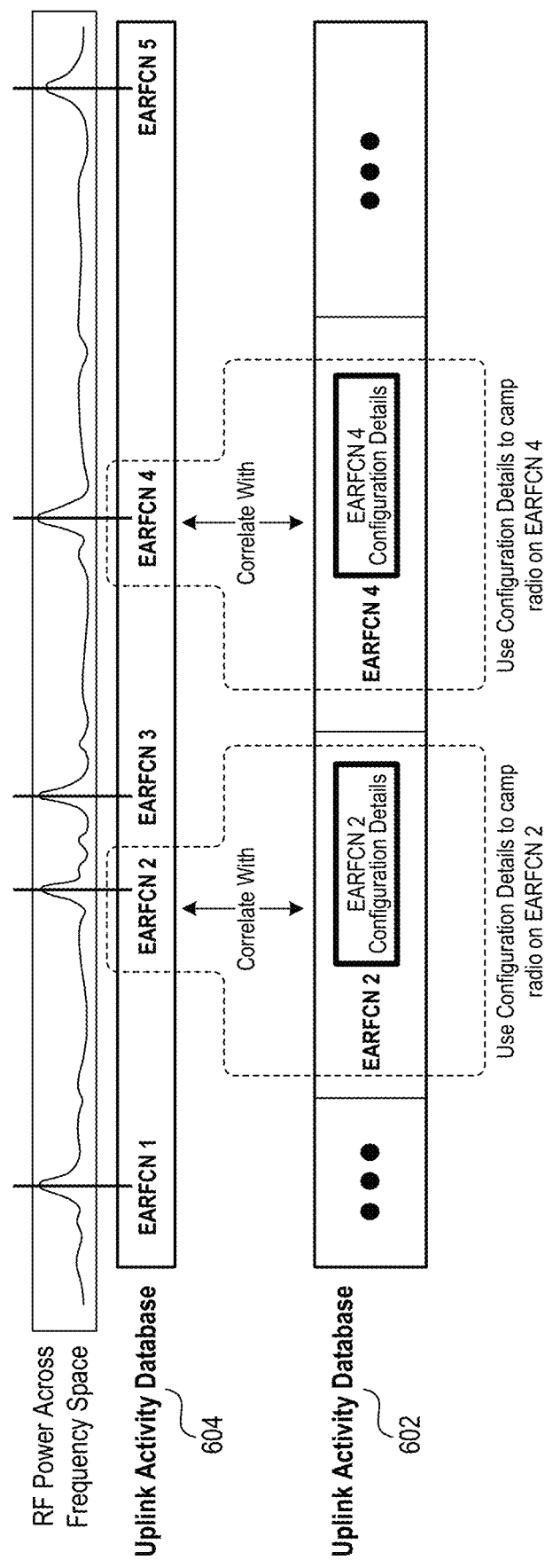
FIG. 6 is a block diagram representing a system configured to constantly monitor identified active channels in a cellular spectrum according to some embodiments of the disclosed technology.

With reference to FIG. 6, for some applications, simply knowing that there is an active UE in the area may be sufficient. In other applications, it may be necessary to obtain additional information about the UE (such as any potentially identifiable information including International Mobile Subscriber Identity (IMSI), Temporary Mobile Subscriber Identity (TMSI), UE Capabilities, or others). These identifying pieces of information are typically not easily decodable without camping on an EARFCN and seeing specific parts of the LTE handshake as they are communicated between the UE and the cell tower. The system can therefore use both the Downlink Configuration Database 602 and the Uplink Activity Database 604 to intelligently camp on any active EARFCNs (e.g., EARFCNs 2 and 4) that are likely being used for actual communications between UEs and cell towers in the area. Once the active EARFCNs are identified, an available radio can be tuned to camp on that channel. While the disclosed embodiments are described as using multiple radios, in some embodiments it is possible to scan the uplink and downlink landscapes and camp on a particular channel using a single SDR.

Figure 7:
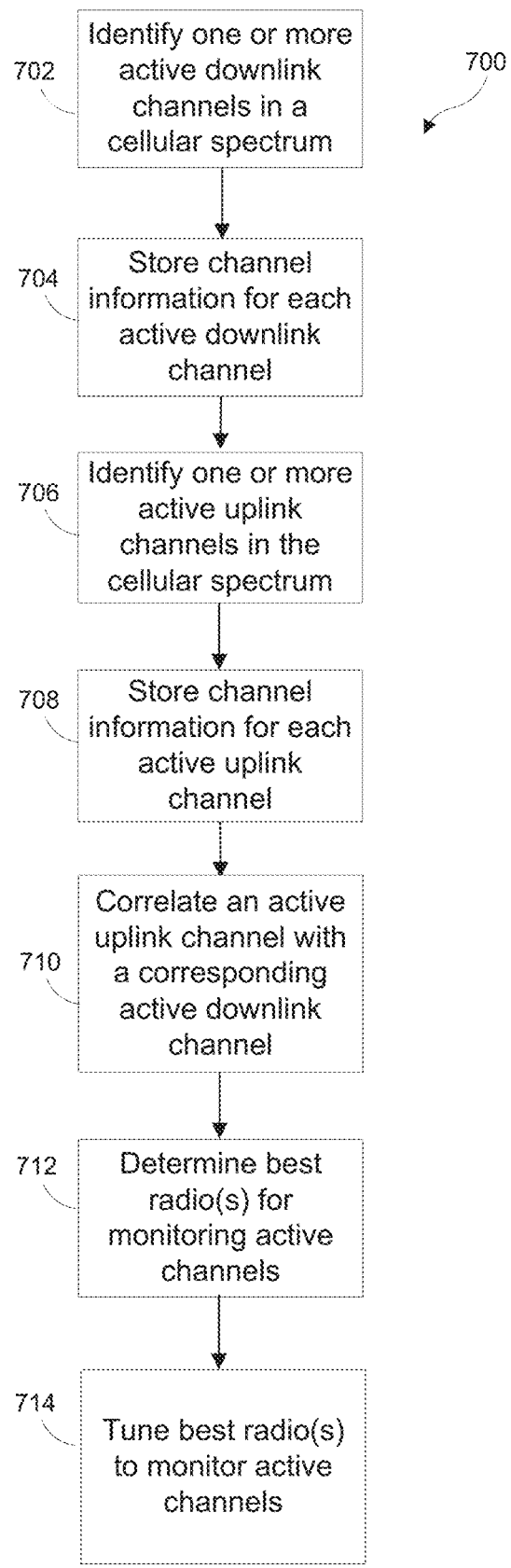
FIG. 7 is a flow diagram showing a method for monitoring cellular communications according to some embodiments of the disclosed technology.

FIG. 7 is a flow diagram showing a method 700 for monitoring cellular communications according to some embodiments of the disclosed technology. At step 702, the method can include identifying one or more active downlink channels using a first radio to monitor each channel in a cellular spectrum for downlink activity. At step 704, the method includes storing downlink channel information, including configuration data, for each of the identified one or more active downlink channels. At step 706 one or more active uplink channels are identified using a second radio to passively monitor each channel in the cellular spectrum for uplink activity. At step 708, the method can include storing uplink channel information for each of the identified one or more active uplink channels. At step 710, at least one of the one or more active uplink channels is correlated with a corresponding one of the active downlink channels. At step 712, the method includes determining the best radio(s) to use for monitoring the active channels. Determining the best radios is describe further below with respect to FIG. 8. At step 714, radios are tuned to the active channels. For example, a third radio can be tuned to the at least one active uplink channel using the configuration data for the corresponding active downlink channel and a fourth radio can be tuned to the active downlink channel corresponding to the at least one active uplink channel using the corresponding configuration data.

As mentioned above, part of the camping process is to make sure that all of the most active EARFCNs are being actively monitored as much of the time as possible. The level of coverage may be heavily influenced by the number of radios in the passive monitoring device 300 (FIG. 3). In a device with limited radios, for example, it is desirable to re-task radios that are monitoring EARFCNs that are no longer used in favor of EARFCNs that are being used with more regularity.

The system regularly assesses both the Downlink Configuration Database, the Uplink Activity Database, and its inventory of available radios in order to determine which hardware should be used to camp on which EARFCNs. If radios are available that are not already camped on any EARFCN, the system can simply assign those unused radios to camp on the active channel. However, if all of the radios are already camped, it must be determined which radio(s) should be re-tasked, if any.

Figure 8:
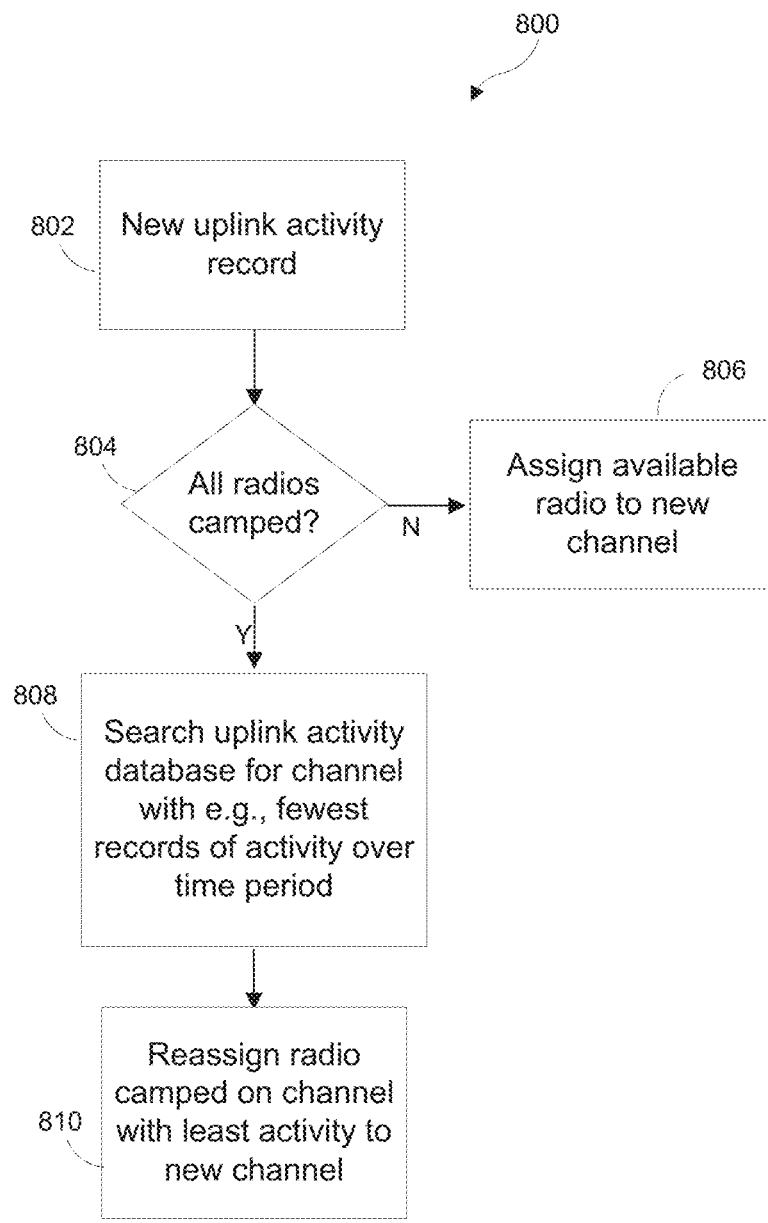
FIG. 8 is a flow diagram showing a method for determining the best radio for monitoring a new channel according to some embodiments of the disclosed technology.

FIG. 8 is a flow diagram showing a method 800 for determining the best radio for monitoring a new channel according to some embodiments of the disclosed technology. At step 802, an active uplink channel is identified and a new Uplink Activity Record is recorded in the Uplink Activity Database. At step 804, the method includes determining If any radios are available to camp. If there is an unassigned radio available, that radio is assigned to the new channel at step 806. However, if all of the radios are already camped, each EARFCN that the radios are currently monitoring is assessed. At step 808, the method can include, for example, searching the Uplink Activity Database for the channel with the fewest records of activity over a selected time period (e.g., Set of Occurrences Within a Time Bucket).

In some embodiments, the selected time period can be one hour. At step 810, the radio camped on the channel with the least activity is reassigned, i.e., re-camped, to the new channel. This process can be repeated as necessary with each new Uplink Activity Record.

While the example above uses a Set of Occurrences Within a Time Bucket to determine the best radio for reassignment, other suitable decision criteria can be used in step 808. For example, with reference to the table in FIG. 9, other suitable decision criteria include (but are not limited to) Total Number of Occurrences, Average Age of Events, and Recency Weight. The specific decision criteria that yields the best performance may depend on the deployment area of the passive sensor device. For example, one area may yield better results when the average age of the uplink activity records is preferentially weighted above the raw number of uplink activity records. In another area, it may be beneficial to use the number of decoded uplink/downlink messages on a particular EARFCN instead of uplink activity record numbers to determine which radios to use.

In some embodiments, the system uses a single radio to monitor uplink activity (or the uplink EARFCN), and another radio to monitor downlink activity (or the downlink EARFCN). This allows the system to benefit from monitoring both directions of traffic (uplink and downlink) for a given UE. Seeing traffic in both directions allows for additional decoding and correlation of a device's potentially identifiable information.

Once the system selects which radio (if any) should be used to camp on a particular EARFCN, it references the Downlink Configuration Database to determine what configuration is necessary for camping the radios on the given EARFCN based on the cell tower's configuration. There may be situations where the system can use a single set of radios to monitor across multiple towers (if the towers use identical or similar configurations to serve the same EARFCN). There may also be situations in which the system needs multiple pairs of radios to monitor a single EARFCN (for example, if different towers are serving the same EARFCN with different technical configuration details).

Occasionally, cellular carriers update the configuration details that their cell towers use to communicate to UEs. This can manifest itself as an update to which EARFCNs are served by a tower, or even just to the technical configuration details for an EARFCN that UEs must use in order to communicate with a tower. If a radio is camped on an EARFCN using one set of configuration details and then the tower changes its configuration details, the camped radios may stop detecting the traffic to and from that tower. It is therefore desirable for the passive sensor device to have an update capability in order to keep up with the changing cellular environment.

The system implements constant scanning of the Downlink Landscape in order to handle these updates. As discussed above, the system constantly uses one radio to monitor the Downlink Landscape. If it ever detects a change in the downlink configuration details, it can take a number of actions: (1) update the Downlink Configuration Database, (2) query the list of actively camped radios in order to determine if any radios were camped on an EARFCN whose configuration has changed, and (3) if necessary, alert those radios and re-camp them with the updated downlink configuration details.

Suitable System

The techniques disclosed here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to cause a computer, a microprocessor, processor, and/or microcontroller (or other electronic devices) to perform a process. The machine-readable medium may include, but is not limited to, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Figure 10:
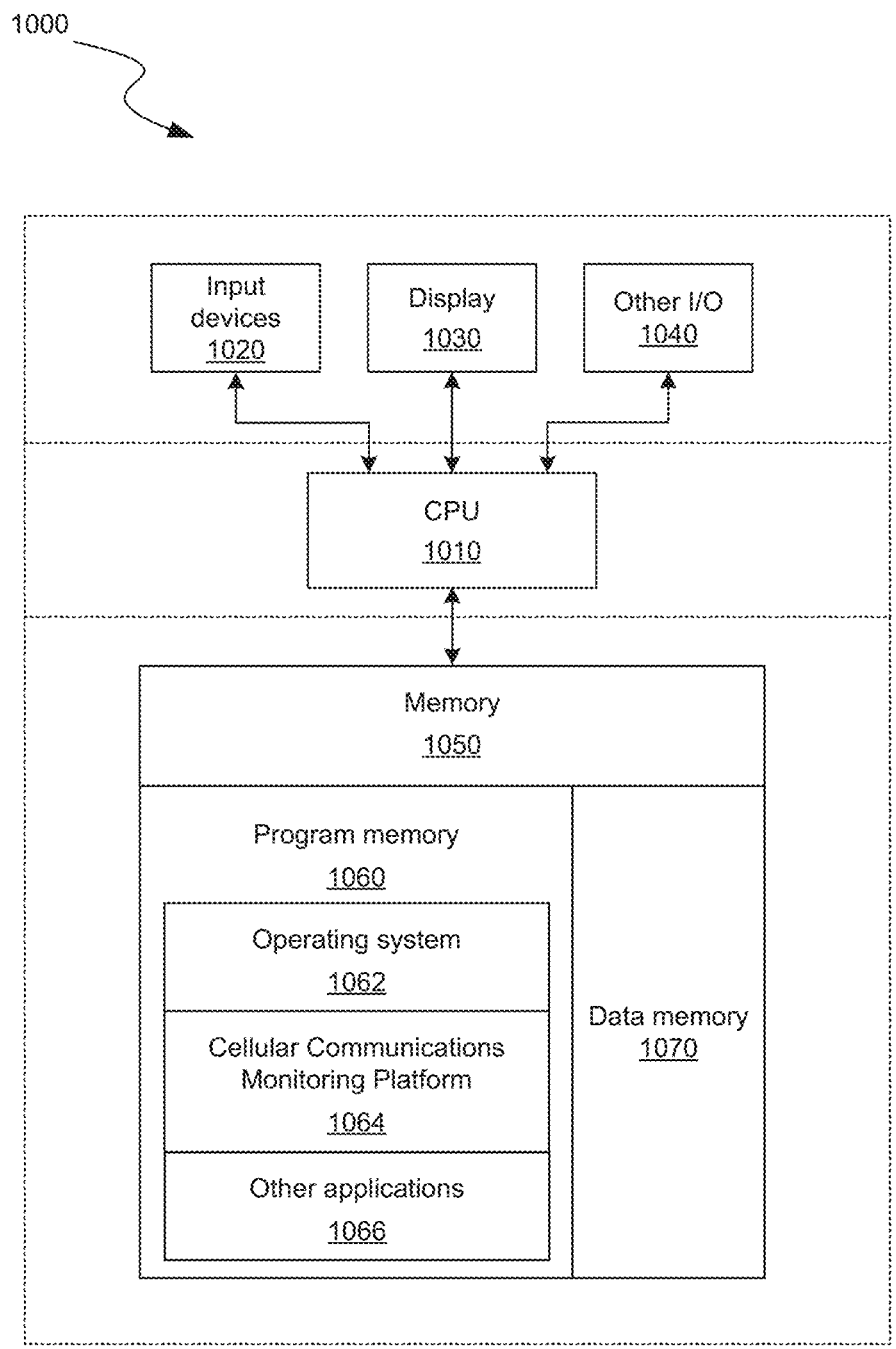
FIG. 10 is a block diagram illustrating an overview of devices on which some implementations can operate.

Several implementations are discussed below in more detail in reference to the figures. FIG. 10 is a block diagram illustrating an overview of devices on which some implementations of the disclosed technology can operate. The devices can comprise hardware components of a device 1000 that monitor cellular communications, for example. Device 1000 can include one or more input devices 1020 that provide input to the CPU (processor) 1010, notifying it of actions. The actions are typically mediated by a hardware controller that interprets the signals received from the input device and communicates the information to the CPU 1010 using a communication protocol. Input devices 1020 include, for example, a mouse, a keyboard, a touchscreen, a microphone, or other user input devices.

CPU 1010 can be a single processing unit or multiple processing units in a device or distributed across multiple devices. CPU 1010 can be coupled to other hardware devices, for example, with the use of a bus, such as a PCI bus or SCSI bus. The CPU 1010 can communicate with a hardware controller for devices, such as for a display 1030. Display 1030 can be used to display text and graphics. In some examples, display 1030 provides graphical and textual visual feedback to a user. In some implementations, the display is separate from the input device. Examples of display devices are: an LCD display screen; an LED display screen; a projected, or augmented reality display (such as a heads-up display device or a head-mounted device); and so on. Other I/O devices 1040 can also be coupled to the processor, such as a network card, video card, audio card, USB, FireWire or other external device, sensor, camera, printer, speakers, CD-ROM drive, DVD drive, disk drive, or Blu-Ray device.

In some implementations, the device 1000 also includes a communication device capable of communicating wirelessly or wire-based with a network node. The communication device can communicate with another device or a server through a network using, for example, TCP/IP protocols. Device 1000 can utilize the communication device to distribute operations across multiple network devices.

The CPU 1010 can have access to a memory 1050. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 1050 can include program memory 1060 that stores programs and software, such as an operating system 1062, cellular communications monitoring platform 1064, and other application programs 1066. Memory 1050 can also include data memory 1070 that can include database information, etc., which can be provided to the program memory 1060 or any element of the device 1000.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, mobile phones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 11:
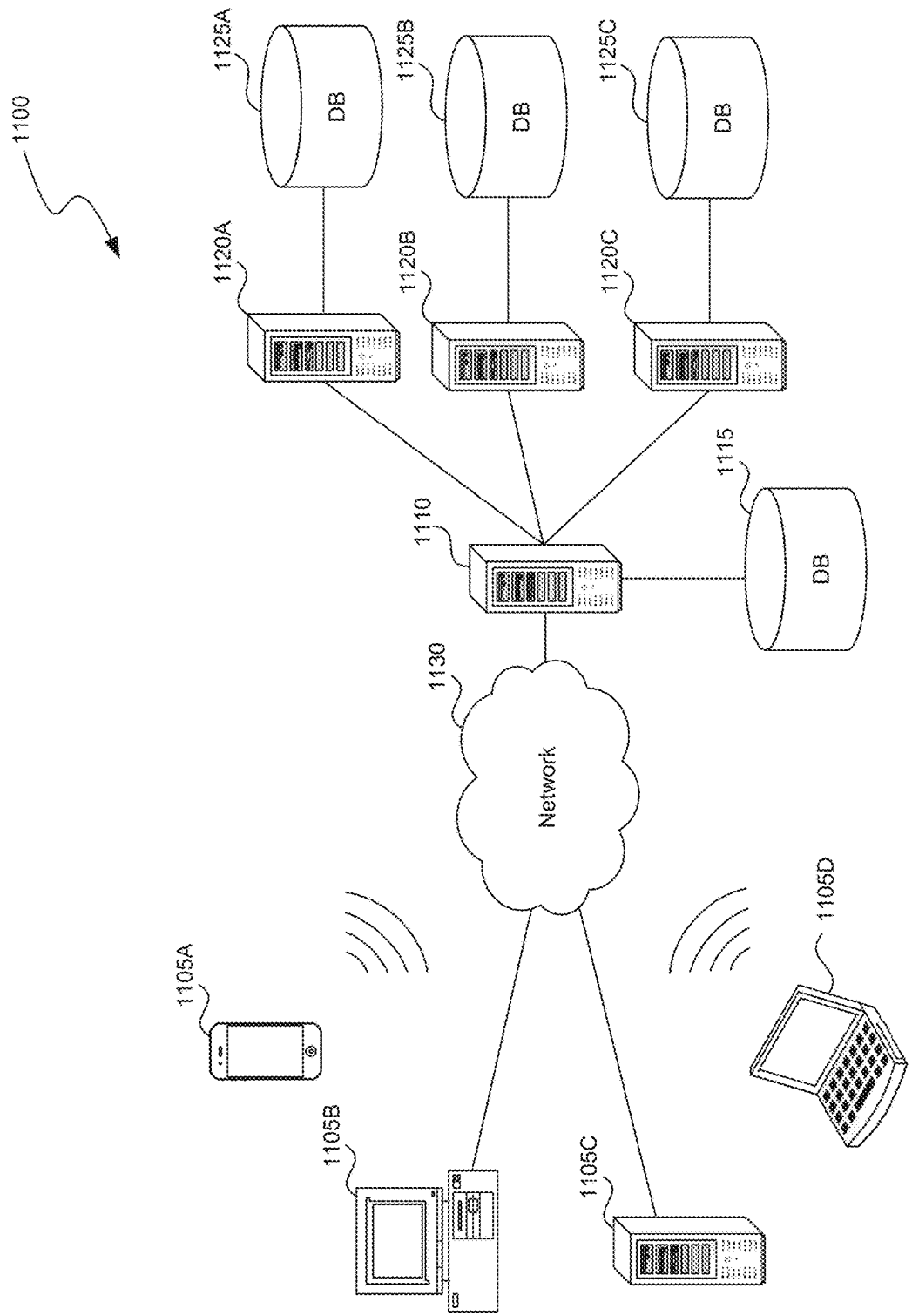
FIG. 11 is a block diagram illustrating an overview of an environment in which some implementations can operate.

FIG. 11 is a block diagram illustrating an overview of an environment 1100 in which some implementations of the disclosed technology can operate. Environment 1100 can include one or more client computing devices 1105A-D, examples of which can include device 1000. Client computing devices 1105 can operate in a networked environment using logical connections through network 1130 to one or more remote computers, such as a server computing device 1110.

In some implementations, server computing device 1110 can be an edge server that receives client requests and coordinates fulfillment of those requests through other servers, such as servers 1120A-C. Server computing devices 1110 and 1120 can comprise computing systems, such as device 1000. Though each server computing device 1110 and 1120 is displayed logically as a single server, server computing devices can each be a distributed computing environment encompassing multiple computing devices located at the same or at geographically disparate physical locations. In some implementations, each server computing device 1120 corresponds to a group of servers.

Client computing devices 1105 and server computing devices 1110 and 1120 can each act as a server or client to other server/client devices. Server 1110 can connect to a database 1115. Servers 1120A-C can each connect to a corresponding database 1125A-C. As discussed above, each server 1120 can correspond to a group of servers, and each of these servers can share a database or can have their own database. Databases 1115 and 1125 can warehouse (e.g., store) information. Though databases 1115 and 1125 are displayed logically as single units, databases 1115 and 1125 can each be a distributed computing environment encompassing multiple computing devices, can be located within their corresponding server, or can be located at the same or at geographically disparate physical locations.

Network 1130 can be a local area network (LAN) or a wide area network (WAN), but can also be other wired or wireless networks. Network 1130 may be the Internet or some other public or private network. Client computing devices 1105 can be connected to network 1130 through a network interface, such as by wired or wireless communication. While the connections between server 1110 and servers 1120 are shown as separate connections, these connections can be any kind of local, wide area, wired, or wireless network, including network 1130 or a separate public or private network.

Figure 12:
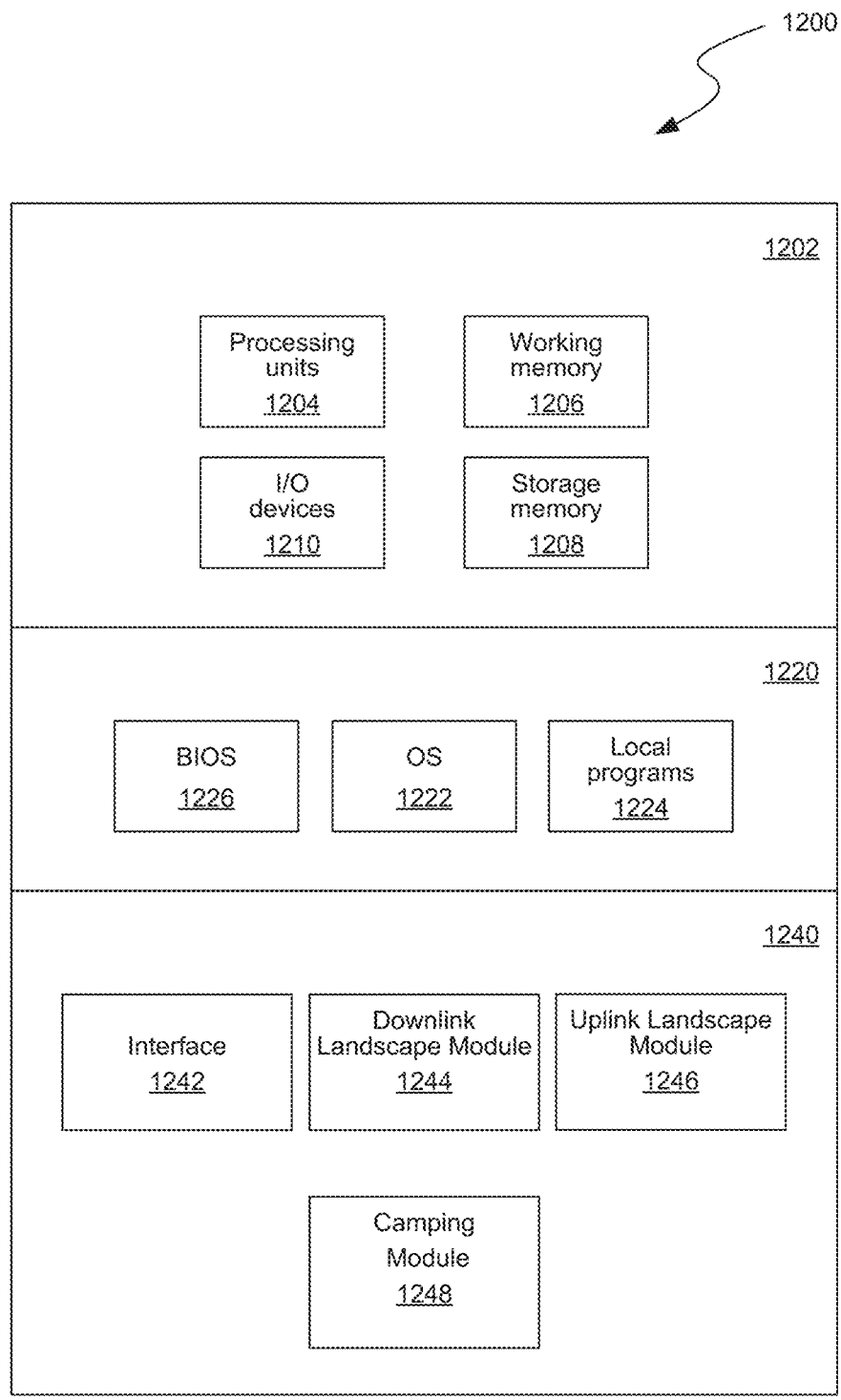
FIG. 12 is a block diagram illustrating components which, in some implementations, can be used in a system employing the disclosed technology.

FIG. 12 is a block diagram illustrating components 1200 which, in some implementations, can be used in a system employing the disclosed technology. The components 1200 include hardware 1202, general software 1220, and specialized components 1240. As discussed above, a system implementing the disclosed technology can use various hardware, including processing units 1204 (e.g., CPUs, GPUs, APUs, etc.), working memory 1206, storage memory 1208, and input and output devices 1210. Components 1200 can be implemented in a client computing device such as client computing devices 1105 or on a server computing device, such as server computing device 1110 or 1120.

General software 1220 can include various applications, including an operating system 1222, local programs 1224, and a basic input output system (BIOS) 1226. Specialized components 1240 can be subcomponents of a general software application 1220, such as local programs 1224. Specialized components 1240 can include a Downlink Landscape Module 1244, an Uplink Landscape Module 1246, a Camping Module 1248, and components that can be used for transferring data and controlling the specialized components, such as interface 1242. In some implementations, components 1200 can be in a computing system that is distributed across multiple computing devices or can be an interface to a server-based application executing one or more of specialized components 1240.

Those skilled in the art will appreciate that the components illustrated in FIGS. 10-12 described above, and in each of the flow diagrams discussed above, may be altered in a variety of ways. For example, the order of the logic may be rearranged, sub steps may be performed in parallel, illustrated logic may be omitted, other logic may be included, etc. In some implementations, one or more of the components described above can execute one or more of the processes described herein.

Although specific embodiments have been shown by way of example in the drawings and are described in detail above, other embodiments are possible. For example, in some embodiments, a system for monitoring cellular communications can include a passive sensor device having at least four radios, one or more processors, and one or more memory devices. The one or more memory devices can have stored thereon instructions that when executed by the one or more processors cause the one or more processors to identify one or more active downlink channels using the first radio to monitor each channel in a cellular spectrum for downlink activity and store downlink channel information, including configuration data, for each of the identified one or more active downlink channels. The processors can identify one or more active uplink channels using the second radio to monitor each channel in the cellular spectrum for uplink activity and store uplink channel information for each of the identified one or more active uplink channels. At least one of the one or more active uplink channels is correlated with a corresponding one of the active downlink channels. The processors tune the third radio to the at least one active uplink channel using the configuration data for the corresponding active downlink channel and also tune the fourth radio to the active downlink channel corresponding to the at least one active uplink channel using the corresponding configuration data.

In some embodiments, the at least four radios are software defined radios. In some embodiments, the system further comprises instructions to capture information related to a mobile wireless device communicating on the at least one active uplink channel and the corresponding active downlink channel. In some embodiments, the system further comprises instructions to periodically update the identified one or more active downlink channels using the first radio to monitor each channel in the cellular spectrum for downlink activity and store updated downlink channel information, including configuration data, for each of the updated one or more active downlink channels. In some embodiments, the system further comprises instructions to periodically update the identified one or more active uplink channels using the second radio to monitor each channel in the cellular spectrum for uplink activity and store updated uplink channel information for each of the updated one or more active uplink channels. In some embodiments, the at least one active uplink channel is a first active uplink channel and the system further comprises instructions to identify a second active uplink channel and tune a fifth radio to the second active uplink channel. In some embodiments, the at least one active uplink channel is a first active uplink channel and the system further comprises instructions to: identify a second active uplink channel, determine which of the radios is tuned to a channel having the least activity based on a selected decision criteria, and tune the radio with the least activity to the second active uplink channel. In some embodiments, the downlink channel information and the uplink channel information are stored on one or more network databases. In some embodiments, the downlink channel information and the uplink channel information are stored locally on the device.

In another representative embodiment, a system for monitoring cellular communications can include a passive sensor device having one or more radios, one or more processors, and one or more memory devices. The one or more memory devices can have stored thereon instructions that when executed by the one or more processors cause the one or more processors to identify one or more active downlink channels using at least one of the one or more radios to monitor each channel in a cellular spectrum for downlink activity and store downlink channel information, including configuration data, for each of the identified one or more active downlink channels. The processors also identify one or more active uplink channels using at least one of the one or more radios to monitor each channel in the cellular spectrum for uplink activity and store uplink channel information for each of the identified one or more active uplink channels. At least one of the one or more active uplink channels is correlated with a corresponding one of the active downlink channels. The processors tune at least one of the one or more radios to the at least one active uplink channel using the configuration data for the corresponding active downlink channel and also tune at least one of the one or more radios to the active downlink channel corresponding to the at least one active uplink channel using the corresponding configuration data. The processors capture information related to a mobile wireless device communicating on the at least one active uplink channel and the corresponding active downlink channel.

In some embodiments, the one or more radios comprise one or more software defined radios. In some embodiments, the at least one active uplink channel is a first active uplink channel and further comprising instructions to identify a second active uplink channel and tune at least one of the one or more radios to the second active uplink channel. In some embodiments, the at least one of the one or more radios monitoring each channel in the cellular spectrum for downlink activity is a first software defined radio and the at least one of the one or more radios monitoring each channel in the cellular spectrum for uplink activity is a second software defined radio that is different from the first.

In a representative embodiment, a method for monitoring cellular communications can comprise identifying one or more active downlink channels using a first radio to passively monitor each channel in a cellular spectrum for downlink activity and storing downlink channel information, including configuration data, for each of the identified one or more active downlink channels. The method can include identifying one or more active uplink channels using a second radio to passively monitor each channel in the cellular spectrum for uplink activity and storing uplink channel information for each of the identified one or more active uplink channels. The method can include correlating at least one of the one or more active uplink channels with a corresponding one of the active downlink channels, tuning a third radio to the at least one active uplink channel using the configuration data for the corresponding active downlink channel, and tuning a fourth radio to the active downlink channel corresponding to the at least one active uplink channel using the corresponding configuration data.

In some embodiments, the method can further comprise capturing information related to a mobile wireless device communicating on the at least one active uplink channel and the corresponding active downlink channel. In some embodiments, the method can further comprise periodically updating the identified one or more active downlink channels using the first radio to monitor each channel in the cellular spectrum for downlink activity and storing updated downlink channel information, including configuration data, for each of the updated one or more active downlink channels. In some embodiments, the method can further comprise periodically updating the identified one or more active uplink channels using the second radio to monitor each channel in the cellular spectrum for uplink activity and storing updated uplink channel information for each of the updated one or more active uplink channels. In some embodiments, the at least one active uplink channel is a first active uplink channel and further comprising identifying a second active uplink channel and tuning a fifth radio to the second active uplink channel. In some embodiments, the at least one active uplink channel is a first active uplink channel and the method further comprises identifying a second active uplink channel, determining which of the radios is tuned to a channel having the least activity based on a selected decision criteria, and tuning the radio with the least activity to the second active uplink channel. In some embodiments, the downlink channel information and the uplink channel information are stored on one or more network databases.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A computer-implemented method for monitoring cellular communications, the method comprising:
    identifying, by a computer device, one or more active downlink channels using a first radio of the computer device to monitor channels in a cellular spectrum for downlink activity;
    storing downlink channel information for the identified one or more active downlink channels;
    identifying one or more active uplink channels using a second radio of the computer device to monitor the channels in the cellular spectrum for uplink activity, wherein the second radio is used to identify the one or more active uplink channels by correlating an increase in Radio Frequency (RF) power of the one or more active uplink channels with the stored downlink channel information;
    storing uplink channel information for the identified one or more active uplink channels;
    periodically updating the stored downlink channel information using the first radio;
    periodically updating the stored uplink channel information using the second radio;
    determining that at least one of the first radio or the second radio is not camped on an E-UTRA Absolute Radio Frequency Channel Number (EARFCN); and
    causing the at least one of the first radio or the second radio to camp on the EARFCN.

2. The computer-implemented method of claim 1, wherein the first radio is further configured to continuously sweep through the cellular spectrum for the downlink activity.

3. The computer-implemented method of claim 1, wherein storing the downlink channel information includes storing configuration data for the identified one or more active downlink channels, and wherein the first radio is further configured to detect a change in respective configuration data of a first active downlink channel.

4. The computer-implemented method of claim 3, wherein the first radio is further configured to query the computer device for a list of radios of the computer device that are monitoring the first active downlink channel.

5. The computer-implemented method of claim 4, wherein the first radio is further configured to provide an alert to the radios of the computer device that are monitoring the first active downlink channel.

6. The computer-implemented method of claim 1, wherein the second radio is further configured to continuously sweep through the cellular spectrum for the uplink activity.

7. A non-transitory computer-readable storage medium storing instructions, which, when executed by at least one computer processor of a computer device, cause the computer device to:
    identify one or more active downlink channels using a first radio of the computer device to monitor channels in a cellular spectrum for downlink activity;
    store downlink channel information for the identified one or more active downlink channels;
    identify one or more active uplink channels using a second radio of the computer device to monitor the channels in the cellular spectrum for uplink activity, wherein the second radio is used to identify the one or more active uplink channels by correlating an increase in Radio Frequency (RF) power of the one or more active uplink channels with the stored downlink channel information;
    store uplink channel information for the identified one or more active uplink channels;
    periodically update the stored downlink channel information using the first radio;
    periodically update the stored uplink channel information using the second radio;
    determine that at least one of the first radio or the second radio is not camped on an E-UTRA Absolute Radio Frequency Channel Number (EARFCN); and
    cause the at least one of the first radio or the second radio to camp on the EARFCN.

8. The non-transitory computer-readable storage medium of claim 7, wherein the first radio is configured to continuously sweep through the cellular spectrum for the downlink activity.

9. The non-transitory computer-readable storage medium of claim 7, wherein storing the downlink channel information includes storing configuration data for the identified one or more active downlink channels, and wherein the first radio is configured to detect a change in respective configuration data of a first active downlink channel.

10. The non-transitory computer-readable storage medium of claim 9, wherein the first radio is configured to query the computer device for a list of radios of the computer device that are monitoring the first active downlink channel.

11. The non-transitory computer-readable storage medium of claim 10, wherein the first radio is configured to provide an alert to the radios of the computer device that are monitoring the first active downlink channel.

12. The non-transitory computer-readable storage medium of claim 7, wherein the second radio is configured to continuously sweep through the cellular spectrum for the uplink activity.

13. A computer-implemented system for monitoring cellular communications, the system comprising:
    a computer device, including:
        at least two radios;
        one or more processors; and
        one or more memory devices having stored thereon instructions that when executed by the one or more processors cause the one or more processors to:
            identify one or more active downlink channels using a first radio of the at least two radios to monitor channels in a cellular spectrum for downlink activity;

store downlink channel information for the identified one or more active downlink channels;

identify one or more active uplink channels using a second radio of the at least two radios to monitor the channels in the cellular spectrum for uplink activity, wherein the second radio is used to identify the one or more active uplink channels by correlating an increase in Radio Frequency (RF) power of the one or more active uplink channels with the stored downlink channel information;

store uplink channel information for the identified one or more active uplink channels;

periodically update the stored downlink channel information using the first radio;

periodically update the stored uplink channel information using the second radio;

determine that at least one of the first radio or the second radio is not camped on an E-UTRA Absolute Radio Frequency Channel Number (EARFCN); and cause the at least one of the first radio or the second radio to camp on the EARFCN.

14. The computer-implemented system of claim 13, wherein the first radio is configured to continuously sweep through the cellular spectrum for the downlink activity.

15. The computer-implemented system of claim 13, wherein the stored downlink channel information includes configuration data for the identified one or more active downlink channels, and wherein the first radio is configured to detect a change in respective configuration data of a first active downlink channel.

16. The computer-implemented system of claim 15, wherein the first radio is configured to query the computer device for a list of radios of the computer device that are monitoring the first active downlink channel.

17. The computer-implemented system of claim 16, wherein the first radio is configured to provide an alert to the radios of the computer device that are monitoring the first active downlink channel.

18. The computer-implemented system of claim 13, wherein the second radio is configured to continuously sweep through the cellular spectrum for the uplink activity.

* * * * *